United States Patent [19]
Frank et al.

[11] Patent Number: 5,878,075
[45] Date of Patent: Mar. 2, 1999

[54] METHOD OF AND APPARATUS FOR GENERATING A PSEUDORANDOM NOISE SEQUENCE

[75] Inventors: Colin D. Frank, Schaumburg; Fuyun Ling, Hoffman Estates, both of Ill.

[73] Assignee: Motorola, Inc., Schaumburg, Ill.

[21] Appl. No.: 687,815

[22] Filed: Jul. 26, 1996

[51] Int. Cl.[6] .............................. H04B 15/00; H04K 1/00
[52] U.S. Cl. ............................................. 375/200; 375/208
[58] Field of Search ....................... 375/200, 206, 375/208; 364/717.01, 717.03; 327/164

[56] References Cited

U.S. PATENT DOCUMENTS

| 4,912,721 | 3/1990 | Pidgeon, Jr. et al. ................. 375/1 |
| 5,228,054 | 7/1993 | Rueth et al. ............................. 375/1 |

OTHER PUBLICATIONS

Cook, Charles E. and Marsh, Howard S., "An Introduction to Spread Spectrum", *IEEE Communications Magazine*, Mar. 1983, pp. 8–16.

Whipple, David P., "The CDMA Standard", *Applied Microwave & Wireless*, pp. 24–37.

Simon, Marvin K. et al., Chapter 5, "Pseudonoise Generators", *Spread Spectrum Communications*, vol. 1, Computer Science Press, 1985, pp. 262–305, & 358–397.

*Primary Examiner*—Chi H. Pham
*Assistant Examiner*—Emmanuel Bayard
*Attorney, Agent, or Firm*—Lalita P. Williams; Donald C. Kordich

[57] ABSTRACT

An augmenting circuit (153) augments an embedded PN sequence of $2^N-1$ chips generated by an N-bit LSSR (111) to provide an augmented PN sequence of $2^N$ chips and an augmented PN sequence of $2^N$ chips shifted by D chips. The augmenting circuit comprises a N-bit counter (123) that counts a plurality of clock bits. The N-bit counter provides a pre-carry signal that changes state when the counter's index equals a predetermined value and provides a value of the N-k most-significant-bits (MSB) of the index. A logic circuit (107,119) receives the plurality of clock bits and responds to the pre-carry signal to gate the plurality of clock bits. A comparator (135) receives the value of the N-k MSB and a threshold value to output a select signal that controls a multiplexer (139).

20 Claims, 5 Drawing Sheets

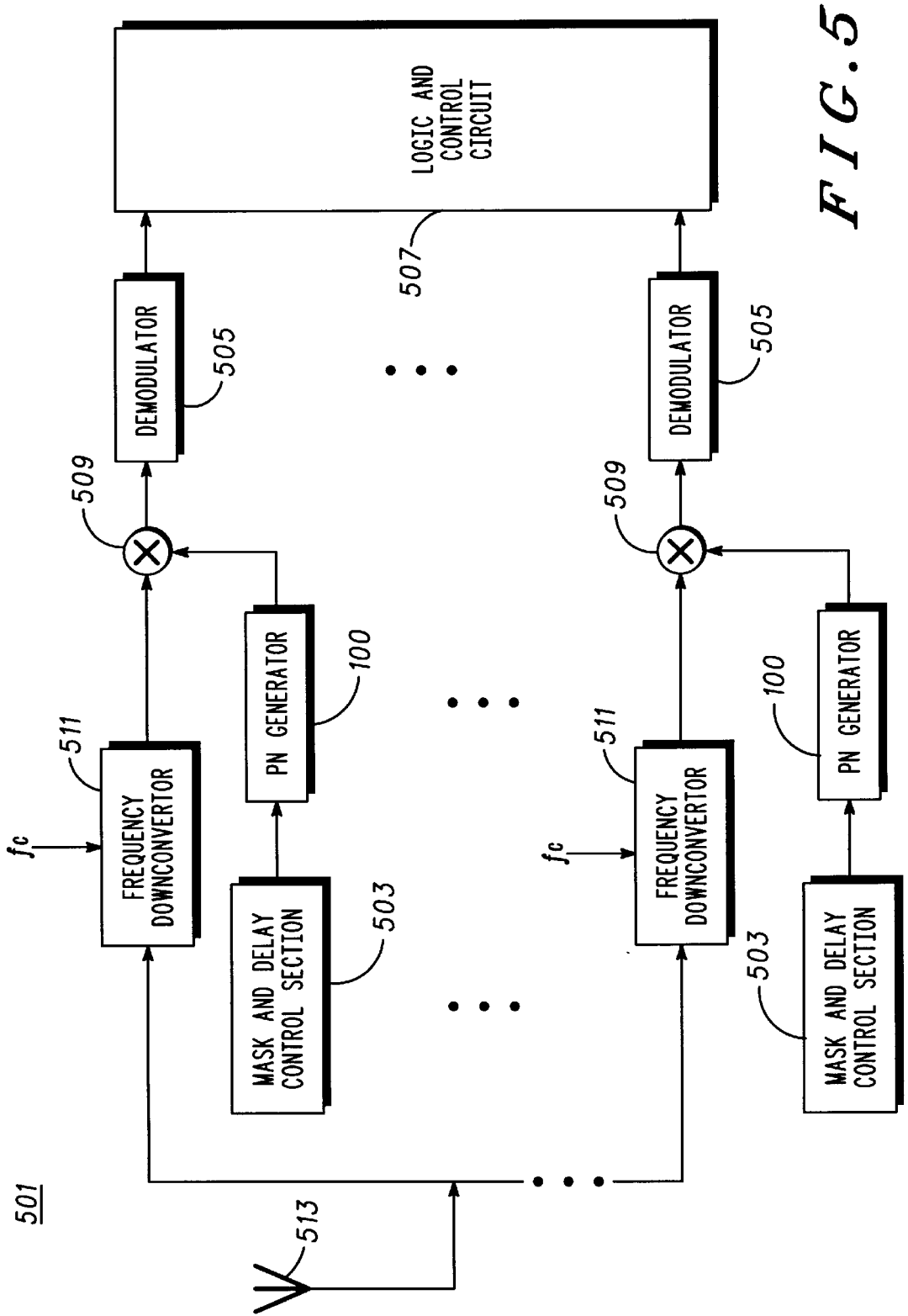

METHOD OF AND APPARATUS FOR GENERATING A PSEUDORANDOM NOISE SEQUENCE

FIELD OF THE INVENTION

The present invention relates generally to the field of digital telecommunications, and more particularly to a method of and apparatus for generating a pseudorandom noise (PN) sequence for use in spread-spectrum communication systems. The invention is especially suited for use in wireless communication devices that utilize Code-Division Multiple Access (CDMA), and will be particularly described in that connection.

BACKGROUND OF THE INVENTION

There are three main multiple-access methods utilized in cellular communication systems. In frequency-division multiple access (FDMA), each carrier frequency represents a channel that provides a cellular-telephone user access to the system. In time-division multiple access (TDMA), each carrier frequency is divided into a number of time slots, and the time slots represent the channels for accessing the system. In CDMA, there are multiple channels assigned to a single carrier frequency as in TDMA, however, a channel is differentiated from other channels of the same frequency by a spreading code imprinted on the user's transmission rather than by a time slot.

In generalized terms, in a receiver of a CDMA system, two digital signals, or bit streams, are combined together to create a third bit stream that is transmitted over a carrier frequency. The first signal contains information, such as the digitized voice of the cellular-telephone user at a data rate of 9600 bits-per-second (bits/s). The second signal is a stream of pseudorandom bits ("chips") at a data rate ("chip rate"), such as 1.23 Megabits/s, which is produced by a PN sequence generator. The second signal contains the "code" that is imprinted on the information by combining the first signal and the second signal. This combination produces a third signal that contains the information of the first signal and has the chip rate and randomness of the second signal. In this example, a single information bit has 128 PN chips combined with it.

The same code applied to the information signal is used by a receiver in the CDMA system to decode the signals received on the carrier frequency, including the third signal as well as other signals sharing the same frequency, and thus extract the information of the first signal.

The Interim Standard IS-95 has been adopted by the Telecommunications Industry Association for implementing CDMA for the North American cellular telephone system. This standard requires a PN sequence generator that can provide a PN sequence of 32,768 chips ($2^{15}$) while simultaneously providing the same PN sequence of chips except shifted by an integer multiple of 64 chips.

For a detailed description of a known PN sequence generator for use in a CDMA system, see U.S. Pat. No. 5,228,054 issued to Rueth et al., incorporated herein by reference. The known PN sequence generator utilizes a 15-stage Linear Sequence Shift Register (LSSR) to generate a PN sequence of 32,767 chips ($2^{15}-1$), and a sequence augmenting circuit that inserts one additional PN chip in the PN sequence of chips, to provide an augmented PN sequence of chips having the required length of 32,768 chips as a primary output. The inserting, or augmenting, is performed by inhibiting for one cycle the change in state of the LSSR when a predetermined 15-bit state of the LSSR is detected, (the LSSR has a respective state for each chip), thus the inserted chip is a repeat of the immediately preceding chip.

The known PN sequence generator also includes a mask circuitry and logic circuitry to provide a shifted version of the PN sequence of chips.

To augment the shifted PN sequence of chips, a correction circuit adds an extra chip to the shifted PN sequence of chips at the appropriate point in the shifted PN sequence of chips and prevents an unwanted chip from being added to the shifted sequence of chips when the extra chip is being inserted in the PN sequence of chips. As was necessary in augmenting the PN sequence of chips to produce the primary output, it is necessary to determine the predetermined state of the LSSR in order to augment the shifted PN sequence of chips.

Because the known PN sequence generator uses the predetermined state of the LSSR in augmenting the PN sequence of chips and shifted PN sequence of chips at the appropriate point in the PN sequence, logic circuitry must be provided that decides when to augment the sequences according to the detected predetermined state of the LSSR. Because this logic circuitry is relatively involved, a need exists for a PN sequence generator that is less complicated.

BRIEF DESCRIPTION OF THE DRAWINGS

FIG. 5 is an electrical block diagram of a wireless communication device.

DESCRIPTION OF THE PREFERRED EMBODIMENTS

The apparatus and method described herein provide advantages over the known PN sequence generator in that fewer components are used to provide the PN sequence of chips and the shifted PN sequence of chips.

According to the present invention, the foregoing advantages are provided by a suppression circuit for augmenting an embedded PN sequence of chips, the suppression circuit comprising a counter including an index that is incremented for each clock bit of a plurality of clock bits, the counter provides a pre-carry signal that changes state when the index equals a predetermined value, and a logic circuit receiving the plurality of clock bits and responsive to the pre-carry signal to gate the plurality of clock bits.

In accordance with another aspect of the invention, a selector 151 augments an embedded PN sequence of $2^N-1$ chips shifted by $n2^k-1$ chips, the selector 151 comprising a N-bit binary counter including an index that is incremented for each clock bit of a plurality of clock bits, the N-bit binary counter 123 provides a value of the N–k most-significant-bits (MSB) of the index, and a comparator 135 receiving the value of the N–k MSB and a threshold value to output a select signal at a first state when the value of the N–k MSB is equal to or less than a threshold value and at a second state otherwise.

In accordance with the method of this invention, the method generates a pseudorandom sequence of $2^N$ chips, the method comprising the steps of providing $2^N$ clock bits, counting the $2^N$ clock bits, providing an inhibit signal on the $2^N$th clock bit, gating the $2^N$ clock bits, and providing the gated $2^N$ clock bits to a N-bit Linear Sequence Shift Register.

In accordance with another method of the invention, the method generates a pseudorandom (PN) sequence of $2^N$ chips shifted by D chips, the method comprising the steps of providing $2^N$ clock bits, counting the $2^N$ clock bits, determining whether the count is equal to or less than D-1, outputting an embedded PN sequence of $2^N-1$ chips shifted by D-1 chips when the count is equal to or less than D-1, and outputting an embedded PN sequence of $2^N-1$ chips shifted by D chips when the count is not equal to or less than D.

Additional advantages and novel features of the invention will be set forth in part in the description which follows, and in part become apparent to those skilled in the art upon examination of the following detailed description or may be learned by practice of the invention. The invention is capable of other and different embodiments, and its several details are capable of modification, all without departing from the scope of the invention. The advantages of the invention may be realized and attained by means of the instrumentalities and combinations particularly pointed out in the appended claims.

Figure 1:
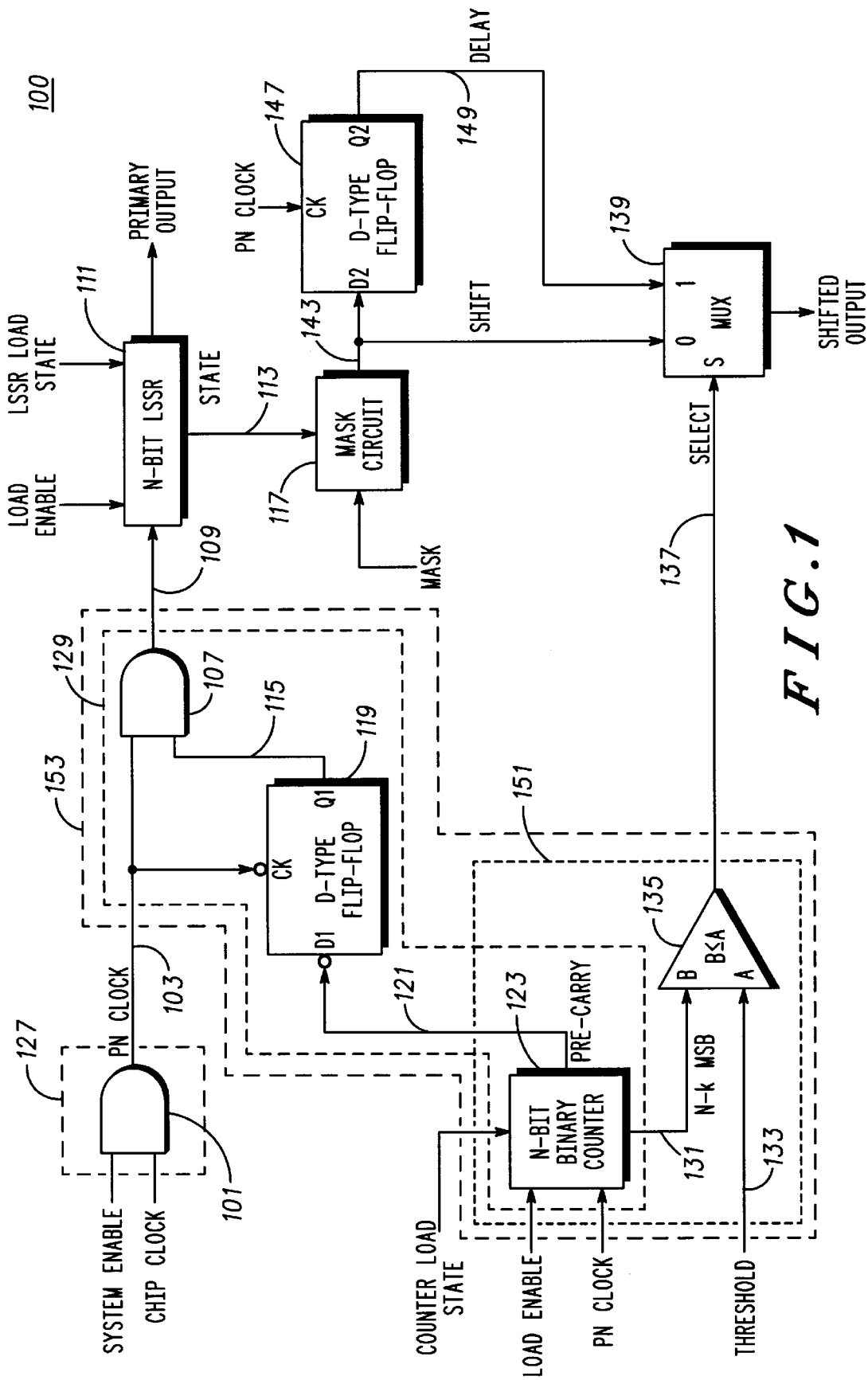
FIG. 1 is an electrical block diagram of a PN sequence generator.
Figure 2:
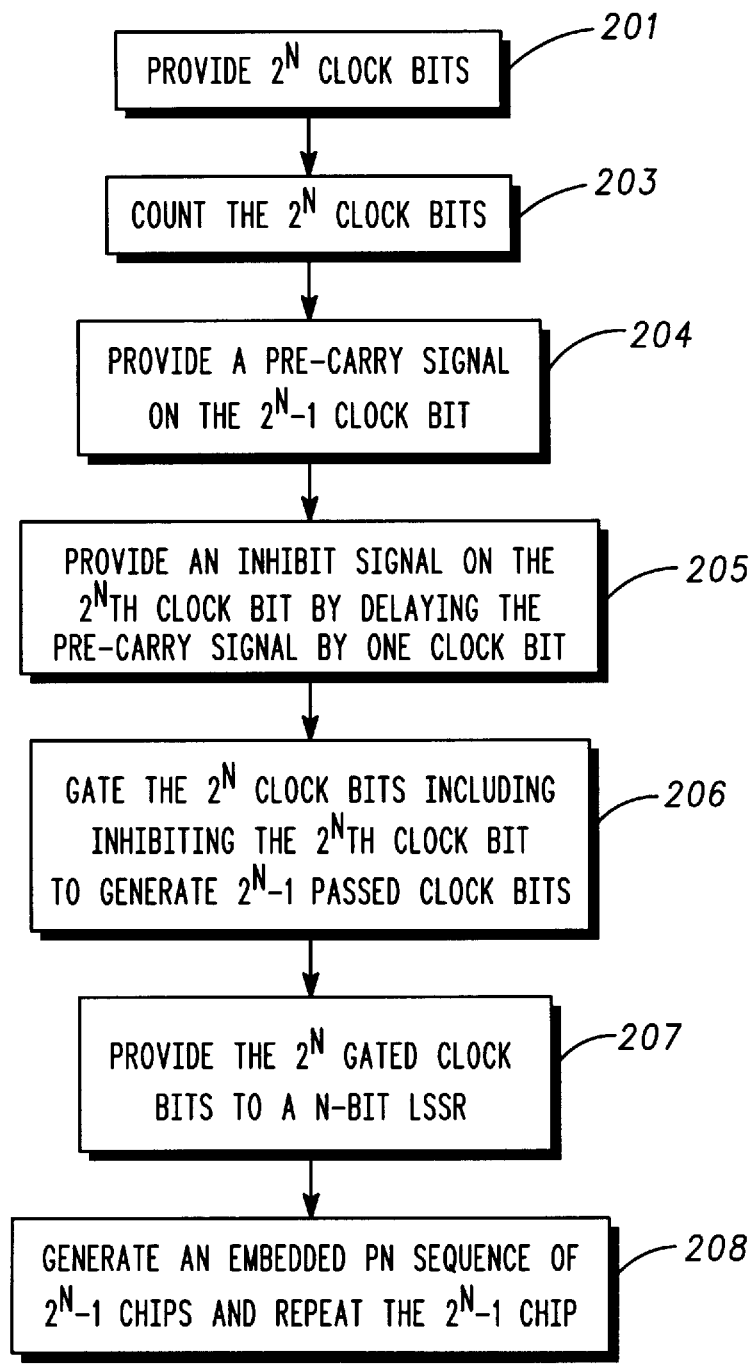
FIG. 2 is a flow chart illustrating the steps of a method performed by the PN sequence generator.

An embodiment configured according to the present invention will now be described with reference to FIG. 1, which is a circuit diagram of a PN sequence generator 100, and FIG. 2, which is a flow chart illustrating the steps of a method performed by the PN sequence generator.

In general terms, N-bit binary counter 123, D-type flip-flop 119, and AND gate 107 constitute elements of a suppression circuit 129, and AND gate 101 constitutes an element of a clock 127. Furthermore, D-type flip-flop 119, and AND gate 107 constitute elements of a logic circuit.

AND gate 101 receives a SYSTEM ENABLE signal and a CHIP CLOCK signal and outputs a PN CLOCK signal on line 103. (Step 201.) The PN CLOCK signal comprises a plurality of clock bits. The PN CLOCK signal is provided to a first input of AND gate 107, and the clock inputs of a D-type flip-flop 119, a N-bit binary counter 123, and a D-type flip-flop 147.

AND gate 107 gates the PN CLOCK signal in response to a signal on line 115 provided to a second input of AND gate 107, and thus passes the clock bits of the PN CLOCK signal to line 109 depending upon the signal on line 115. (Step 206.)

The passed PN CLOCK signal is provided to an N-bit LSSR 111 and serves to clock this device. (Step 207.) Additionally, a LOAD ENABLE signal and LSSR LOAD STATE signal are provided to N-bit LSSR 111, and these signals serve to set the initial state of N-bit LSSR 111

N-bit binary counter 123 receives not only the PN CLOCK signal but also a LOAD ENABLE signal and COUNTER LOAD STATE signal. The LOAD ENABLE signal and COUNTER LOAD STATE signal are used to initialize an index of N-bit binary counter 123. N-bit binary counter 123 counts each clock bit of the PN CLOCK signal by incrementing an index of the counter for each clock bit of the PN CLOCK signal. (Step 203.) N-bit binary counter 123 outputs a PRE-CARRY signal on line 121. (Step 204.) The PRE-CARRY signal is one state, and then changes to another state when the index reaches a predetermined value.

D-type flip-flop 119 receives the PRE-CARRY signal at its inverting input D1. The output Q1 provides the inverse of the state of the PRE-CARRY signal delayed by one clock bit onto line 115, referred to as the INHIBIT signal. The INHIBIT signal controls the passage of the clock bits of the PN CLOCK signal onto line 109 via AND gate 107. (Step 205.)

In a preferred embodiment of a PN sequence generator configured according to the invention, the N-bit LSSR 111 has 15 bits and can generate an embedded PN sequence of 32,767 chips ($2^{15}-1$) at the PRIMARY OUTPUT, each chip being generated in response to a passed PN CLOCK bit. (Step 208.) To augment the embedded PN sequence of 32,767 chips by one chip to obtain the required 32,768 chips, a chip is added to the end of the embedded PN sequence by repeating the last chip of the embedded PN sequence of chips. (Step 208.)

Figure 3:
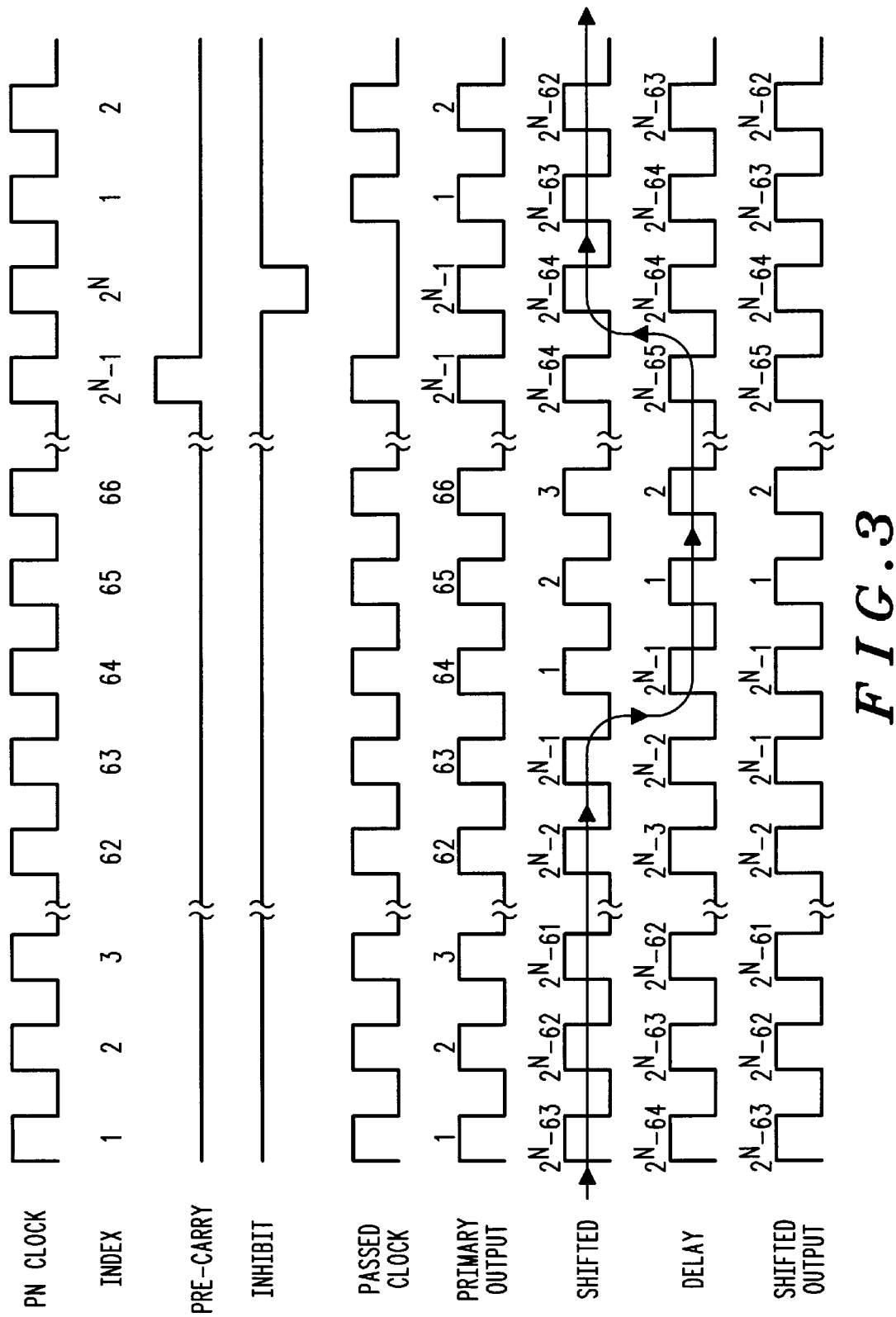
FIG. 3 is a chart illustrating the timing of the signals of the PN sequence generator.

The timing of the signals to produce the augmented PN sequence of chips is illustrated in the chart of FIG. 3. The PN CLOCK signal on line 103 is labeled as PN CLOCK. For reference, the clock bits have been numbered from 1 to $2^N$, which corresponds to the count of the index of N-bit binary counter 123.

During the count from 1 to $2^N-2$, the PRE-CARRY signal on line 121, labeled as PRE-CARRY in FIG. 3, is normally a logic zero; and the INHIBIT signal on line 115, labeled as INHIBIT, is normally a logic one. While the logic one is provided to AND gate 107, the clock bits of PN CLOCK are passed onto line 109, which is labeled as PASSED CLOCK. Each passed clock bit causes a change in state of N-bit LSSR 111, and correspondingly a generation of a respective chip of the embedded sequence of chips, illustrated as chips 1 through $2^N-1$ of the PRIMARY OUTPUT signal, which is labeled as PRIMARY OUTPUT in FIG. 3. In this illustration, the chips are shown as all logic ones for exemplary purposes. In the preferred embodiment, the chips are pseudorandom.

When the index reaches $2^N-1$, PRE-CARRY changes state to a logic one, and INHIBIT changes state to logic zero on the next bit clock bit, which is $2^N$. Thus, on the $2^N$th clock bit, a logic zero is provided to the second input to AND gate 107, and consequently the $2^N$th clock bit of PN CLOCK is suppressed and does not appear in PASSED CLOCK. Accordingly, N-bit LSSR 111 does not change state, i.e., it is "frozen," on the $2^N$th clock bit of PN CLOCK. Thus the $2^N$th chip is "added" to the embedded PN sequence of $2^N-1$ chips and has the same logic value as the $2^N-1$ chip. This $2^N$th chip in combination with the embedded PN sequence of $2^N-1$ chips generated by N-bit LSSR 111 constitutes the augmented PN sequence of chips of the PRIMARY OUTPUT signal.

The cycle can be repeated to continuously generate the augmented PN sequence of $2^N$ chips.

The use of N-bit binary counter 123 to time the augmentation of the embedded PN sequence of chips is an important feature of the invention, because it eliminates the need to detect the predetermined state of the LSSR and the associated logic circuitry, as required by the known PN sequence generator.

In addition to providing an augmented PN sequence of chips, the PN sequence generator 100 provides the augmented PN sequence of chips shifted by a certain number of chips D. In the preferred embodiment, D is an integer multiple of 64 chips, and can be represented as $n2^k$, where n is a positive integer between 1 and 511, and k equals 6.

Figure 4:
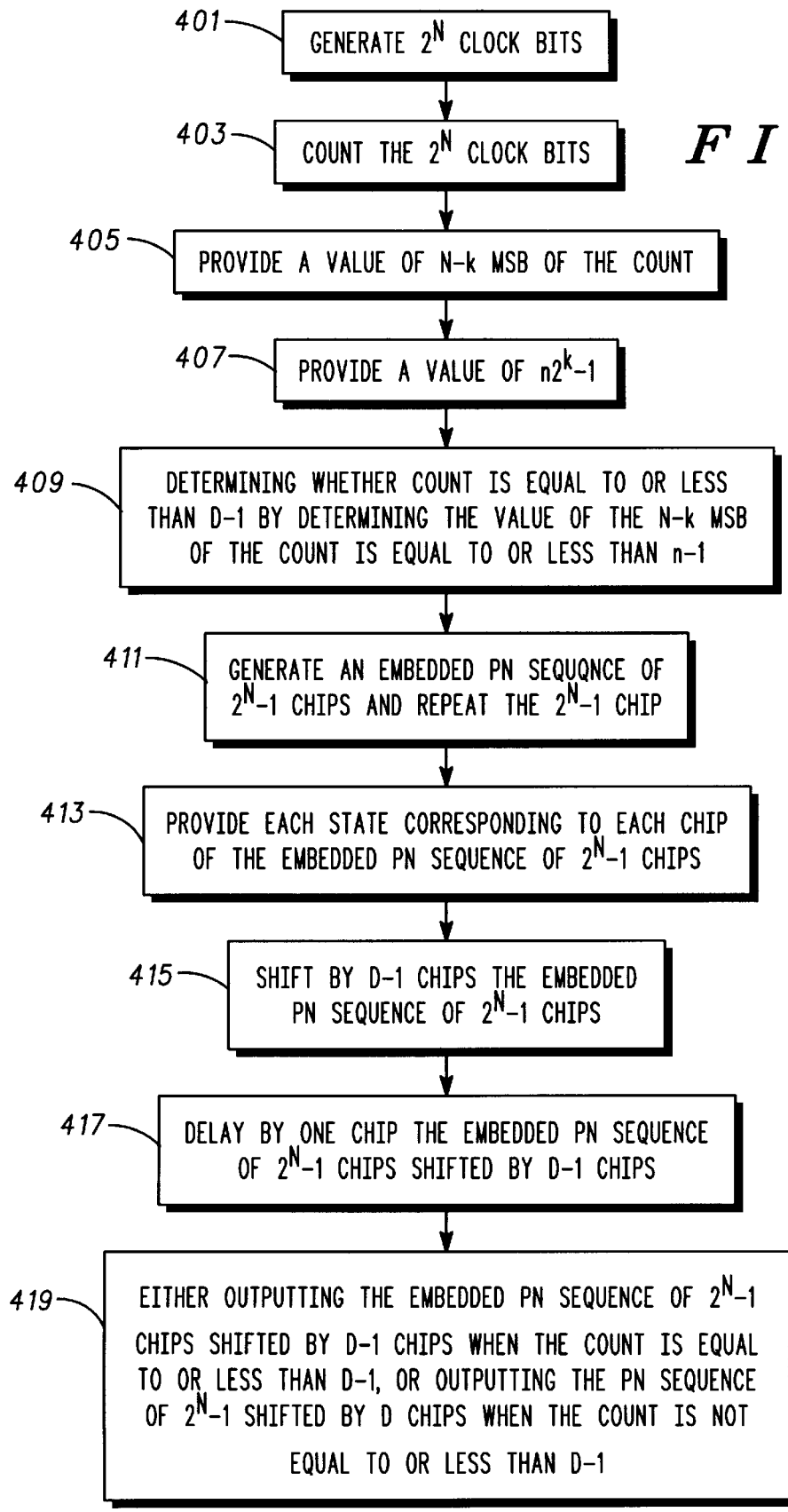
FIG. 4 is a flow chart illustrating the steps of another method performed by the PN sequence generator.

Referring back to FIG. 1 and additionally to FIG. 4, which is flow chart illustrating the steps of another method performed by the PN sequence generator, the $2^N$ clock bits are generated, (step 401), the N-bit counter 123 counts the clock bits, (step 403), and, as the embedded and repeated chips are generated, (step 41 1), the respective state corresponding to each chip is provided on line 113, (step 413). The signal on line 113 is referred to as the STATE signal. A mask circuit 117 receives the STATE signal and responds to a mask, referred to as a MASK signal, to provide the embedded PN sequence of chips shifted by D−1 chips on line 143. (Step 415.) A D-type flip-flop 147 receives the embedded PN sequence of chips shifted by D−1 chips, and provides at output Q2 the embedded PN sequence of chips shifted by D chips, i.e., by one additional chip. (Step 417.) A multiplexer 139 receives at input "0" the embedded PN sequence of chips shifted by D−1 chips and at input "1" the embedded PN sequence of chips shifted by D chips. Multiplexer 139 is responsive to a SELECT signal on a line 137 and outputs either the embedded PN sequence of chips shifted by D−1 chips or the embedded PN sequence of chips shifted by D chips, depending upon the state of the SELECT signal.

As will be described in detail, switching multiplexer 139 at the appropriate time augments the length of the embedded PN sequence of chips shifted by D−1 chips and prevents insertion of a repeat of an unwanted chip when the N-bit LSSR is "frozen."

A selector 151 provides the SELECT signal to switch multiplexer 139 at the appropriate time. Selector 151 comprises N-bit binary counter 123 that additionally provides the count on line 131, and a comparator 135 that receives the value of the count at input B and the value of D−1 at input A via a line 133. The signal on line 133 is referred to as the THRESHOLD signal. In the preferred embodiment, provided to input B is a value of the N−k most-significant-bits (MSB) of the count, (step 405), and provided to input A is a value of n−1, (step 407), where n is the desired number of 64 chip-segments to shift augmented the PN sequence of chips.

Comparator 135 determines whether the count is equal to or less than D−1. In the preferred embodiment this determination is made by comparing the value of the N−k MSB and the value of n−1. (Step 409.) When the value of the N−k MSB is equal to or less than the value of n−1, comparator 135 outputs a SELECT signal that controls multiplexer 139 to output the embedded PN sequence of chips shifted by D−1 chips and embedded PN sequence of chips shifted by D chips otherwise. (Step 419).

FIG. 3 illustrates an example of the timing of signals that, at the appropriate time, augments the length of the embedded PN sequence of chips and prevents insertion of a repeat of an unwanted chip when the N-bit LSSR is "frozen." In this example the desired relative shift D is equal to 64 bits, thus n equals 1 and k equals 6. The desired augmented PN sequence of chips generated at SHIFTED OUTPUT is labeled as SHIFTED in the chart; the embedded PN sequence of chips shifted by 63 chips (D−1) is labeled as SHIFTED; and the embedded PN sequence of chips shifted by 64 chips (D) is labeled as DELAY. The chips of SHIFTED OUTPUT, SHIFTED, and DELAY are numbered to correspond to the chips of PRIMARY OUTPUT to illustrate the shift of the chips.

During the first 63 clock bits of PN CLOCK, the value the THRESHOLD signal and the N−k MSB of the count are zero. Accordingly, multiplexer 139 outputs SHIFTED. Upon occurrence of the 64th clock bit, the value the N−k MSB of the count changes from zero to one, which is greater than zero, causing multiplexer 139 to output DELAY. The "path" of the switching is shown by the line passing through the chips of SHIFTED and DELAY.

The switch from SHIFT to DELAY provides augmentation of the embedded PN sequence of chips shifted by 63 chips at the same relative position as the augmentation of the embedded PN sequence of chips. That is, the augmentation occurs immediately after the last chip of the embedded PN sequence of chips shifted by 63 chips, by reproducing the $2^N-1$ chip. Furthermore, the augmentation is achieved without detecting the predetermined state of the LSSR, and associated logic circuitry, as is required in the known PN sequence generator. Instead, the same N-bit LSSR is used to augment the embedded PN sequence of chips shifted by D−1 chips as was used to augment the embedded PN sequence of chips.

After the switch from SHIFTED to DELAY, the embedded PN sequence of chips shifted by 64 chips continues to be output as the index increases from 64 until it exceeds a predetermined value equal to $2^{15}$. At this point, the index is reset to zero, the SELECT signal changes state, and multiplexer 139 again outputs SHIFT.

The switch from DELAY to SHIFT prevents insertion of a repeat of an unwanted chip when the N-bit LSSR is "frozen." This is achieved without detecting the predetermined state of the LSSR, and associated logic circuitry, as is required in the known PN sequence generator.

FIG. 5 is an electrical block diagram of a wireless communication device 501, such as a cellular radiotelephone, employing the described PN sequence generator 100. Only the receiver path is shown in some detail, and it is arranged as a Rake receiver with multiple parallel paths.

An antenna 513 receives an encoded signal transmitted at a carrier frequency. A first frequency downconvertor 511 downconverts the received signal to baseband level by combining a reference frequency $f_c$.

In response to control signals provided by mask and delay control section 503, such as, the THRESHOLD signal and the MASK signal, PN sequence generator 100 provides the PN sequence of $2^N$ chips shifted by D chips to a second frequency downconvertor 509. Second frequency downconvertor 509 combines the downconverted encoded signal and the shifted PN sequence of chips to decode the downconverted encoded signal. A demodulator 505 demodulates the decoded signal and provides it to a logic and control circuit 507 for further processing.

In summary, the described embodiment uses a suppression circuit and selector, both employing an N-bit counter, to time the augmentation of the embedded PN sequence of chips and the embedded PN sequence of chips shifted by D−1 chips in providing the respective augmented PN sequence of chips and augmented PN sequence of chips shifted by D chips. This embodiment using a less complicated and more logically intuitive approach, which provides the advantage of circuit that requires fewer components than the known PN sequence generator. Those skilled in the art will recognize that various modifications and variations can be made in the PN sequence generator of the present invention and in construction of this PN sequence generator without departing from the scope or spirit of this invention.

What is claimed is:

1. A N-bit pseudorandom (PN) sequence generator comprising:
   a clock providing a plurality of clock bits;
   a suppression circuit including a N-bit binary counter responding to the plurality of clock bits to increment an index of the N-bit binary counter for each clock bit, the N-bit binary counter passing the plurality of clock bits except a one clock bit of the plurality of clock bits when the index equals a predetermined value; and a N-bit Linear Sequence Shift Register (LSSR) responding to the passed clock bits to generate an augmented PN sequence of chips.

2. The N-bit PN sequence generator of claim 1, wherein the suppression circuit further includes:

the N-bit binary counter provides a pre-carry signal that changes state when the index equals the predetermined value of $2^N-1$;

a D-type flip-flop for delaying the pre-carry signal by one clock bit to thus create an inhibit signal; and an AND gate receiving the plurality of clock bits and the inhibit signal to suppress the one clock bit when the index equals $2^N$.

3. The N-bit PN sequence generator of claim 1 further comprising:

the N-bit LSSR is of a respective state for each chip generated;

a mask circuit, receiving the respective state, responding to a mask to provide a shifted PN sequence of chips;

a D-type flip-flop, receiving the shifted PN sequence of chips, to provide a delayed, shifted PN sequence of chips;

a selector providing a select signal; and a multiplexer, receiving as input the shifted PN sequence of chips and the delayed, shifted PN sequence of chips, responding to the select signal to output a selected one of the shifted PN sequence of chips and the delayed, shifted PN sequence of chips.

4. An N-bit pseudorandom (PN) sequence generator comprising:

a clock providing a plurality of clock bits:

a suppression circuit including a N-bit binary counter responding to the plurality of clock bits to increment an index of the N-bit binary counter for each clock bit, wherein the N-bit binary counter provides a value of an N-k most-significant-bits (MSB) of the index, the suppression circuit passing the plurality of clock bits except a one clock bit of the plurality of clock bits when the index equals a predetermined value;

a N-bit Linear Sequence Shift Register (LSSR) responding to the passed clock bits to generate an augmented PN sequence of chips, wherein the N-bit LSSR is of a respective state for each chip generated;

a mask circuit, receiving the respective state, responding to a mask to provide a shifted PN sequence of chips that is shifted by an integer multiple of $2^k$ chips;

a D-type flip-flop, receiving the shifted PN sequence of chips, to provide a delayed, shifted PN sequence of chips;

a selector including a comparator, wherein the selector receives the value of the N-k MSB and the integer multiple of $2^k$ chips minus one, to output a select signal at a first state when the value of the N-k MSB is equal to or less than the integer multiple of $2^k$ chips minus one and at a second state otherwise; and a multiplexer, receiving as input the shifted PN sequence of chips and the delayed, shifted PN sequence of chips, responding to the select signal to output a selected one of the shifted PN sequence of chips when the select signal is a first state and to output the delayed, shifted PN sequence of chips otherwise.

5. A suppression circuit for augmenting an embedded PN sequence of chips, the suppression circuit comprising:

a counter including an index that is incremented for each clock bit of a plurality of clock bits, the counter provides a pre-carry signal that changes state when the index equals a predetermined value; and a logic circuit receiving the plurality of clock bits and responding to the pre-carry signal to gate the plurality of clock bits.

6. The suppression circuit of claim 5 wherein the logic circuit suppresses a one clock bit of the plurality of clock bits bit after the pre-carry signal changes state.

7. The suppression circuit of claim 5 wherein the embedded PN sequence of chips has a length $2^N-1$, and the counter changes the state of the pre-carry signal when the index equals the predetermined value of $2^N-1$.

8. The suppression circuit of claim 5 wherein the logic circuit comprises:

a D-type flip-flop to delay the pre-carry signal by one clock bit to create an inhibit signal; and an AND gate responding to the inhibit signal to suppress a one clock bit of the plurality of clock bits when the inhibit signal changes state.

9. A selector for augmenting an embedded PN sequence of $2^N-1$ chips shifted by $n2^k-1$ chips, the selector comprising:

a N-bit binary counter including an index that is incremented for each clock bit of a plurality of clock bits, the N-bit binary counter provides a value of the N-k most-significant-bits (MSB) of the index; and a comparator receiving the value of the N-k MSB and a threshold value to output a select signal at a first state when the value of the N-k MSB is equal to or less than a threshold value and at a second state otherwise.

10. The selector of claim 9 the threshold value is equal to n-1.

11. An augmenting circuit for augmenting an embedded PN sequence of $2^N-1$ chips, the augmenting circuit comprising:

a N-bit counter including an index that is incremented for each clock bit of a plurality of clock bits, the N-bit counter provides a pre-carry signal that changes state when the index equals a predetermined value and provides a value of the N-k most-significant-bits (MSB) of the index;

a logic circuit receiving the plurality of clock bits and responding to the pre-carry signal to gate the plurality of clock bits; and a comparator receiving the value of the N-k MSB and a threshold value to output a select signal at a first state when the value of the N-k MSB is equal to or less than the threshold value and at a second state otherwise.

12. A method of generating a pseudorandom sequence of $2^N$ chips, the method comprising the steps of:

providing $2^N$ clock bits;

counting the $2^N$ clock bits;

providing a pre-carry signal on a $2^N-1$ clock bit;

delaying the pre-carry signal by one clock bit to provide an inhibit signal on the $2^N$th clock bit:

gating the $2^N$ clock bits: and providing the gated $2^N$ clock bits to a N-bit Linear Sequence Shift Register.

13. A method of generating a pseudorandom (PN) sequence of $2^N$ chips shifted by D chips, the method comprising the steps of:

providing $2^N$ clock bits;

counting the $2^N$ clock bits;

determining whether the count is equal to or less than D−1;

outputting an embedded PN sequence of $2^N-1$ chips shifted by D−1 chips when the count is equal to or less than D−1; and outputting an embedded PN sequence of $2^N-1$ chips shifted by D chips when the count is not equal to or less than D.

14. The method of claim 13 further comprising the steps of:

generating an embedded PN sequence of $2^N-1$ chips;

providing each state corresponding to each chip of the embedded PN sequence of $2^N-1$ chips; and shifting by D−1 chips the embedded PN sequence of $2^N-1$ chips.

15. The method of claim 14 further comprising the step of shifting by one chip the embedded PN sequence of $2^N-1$ chips shifted by D−1 chips.

16. The method of claim 13, wherein D equals $n2^k$ and n and k are integers, the method further comprising the steps of:

providing the value of the N−k most-significant-bits (MSB) of the count; and providing the value of $n2^k-1$;

wherein the step determining whether the count is equal to or less than D−1 includes the sub-step of determining whether the value of the N−k MSB of the count is equal to or less than the value of n−1.

17. A method of generating a pseudorandom (PN) sequence of $2^N$ chips and the PN sequence of $2^N$ chips shifted by D chips, the method comprising the steps of:

providing $2^N$ clock bits;

counting the $2^N$ clock bits;

providing an inhibit signal on the $2^N$th clock bit;

gating the $2^N$ clock bits;

providing the gated $2^N$ clock bits to a N-bit Linear Sequence Shift Register 111 to generate an embedded PN sequence of $2^N-1$ chips;

shifting by D−1 chips embedded PN sequence of $2^N-1$ chips;

delaying by one chip the embedded PN sequence of $2^N-1$ chips shifted by D−1 chips;

determining whether the count is equal to or less than D−1; and either outputting the embedded PN sequence of $2^N-1$ chips shifted by D−1 chips when the count is equal to or less than D−1, or outputting the embedded PN sequence of $2^N-1$ chips shifted by D chips when the count is not equal to or less than D−1.

18. The method of claim 17 further comprising the steps of:

providing a pre-carry signal on the $2^N-1$ clock bit; and delaying the pre-carry signal by one clock bit to provide the inhibit signal.

19. The method of claim 18, wherein D equals $n2^k$ and n and k are integers, the method further comprising the steps of:

providing the value of the N−k most-significant-bits (MSB) of the count; and providing the value of $n2^k-1$;

wherein the step determining whether the count is equal to or less than D−1 includes the sub-step of determining whether the value of the N−k MSB of the count is equal to or less than the value of n−1.

20. A radiotelephone comprising:

a clock providing a plurality of clock bits;

a suppression circuit including a N-bit binary counter responding to the plurality of clock bits to increment an index of the N-bit binary counter for each clock bit, wherein the N-bit binary counter provides a value of an N−k most-significant-bits (MSB) of the index, the suppression circuit passing the plurality of clock bits except a one clock bit of the plurality of clock bits when the index equals a predetermined value;

an N-bit Linear Sequence Shift Register (LSSR) responding to the passed clock bits to generate an augmented PN sequence of chips, the N-bit LSSR is of a respective state for each chip generated;

a mask circuit, receiving the respective state, responding to a mask to provide a shifted PN sequence of chips that is shifted by an integer multiple of $2^k$ chips;

a D-type flip-flop, receiving the shifted PN sequence of chips, to provide a delayed, shifted PN sequence of chips;

a selector including a comparator, wherein the selector receives the value of the N−k MSB and the integer multiple of $2^k$ chips minus one, to output a select signal at a first state when the value of the N−k MSB is equal to or less than the integer multiple of $2^k$ chips minus one and to output a select signal at a second state otherwise;

a multiplexer, receiving as input the shifted PN sequence of chips and the delayed, shifted PN sequence of chips, responding to the select signal to output a selected one of the shifted PN sequence of chips when the select signal is a first state and to output the delayed, shifted PN sequence of chips otherwise;

an antenna for receiving an encoded signal;

a first frequency downconvertor for downconverting the encoded signal; and a second frequency downconvertor receiving the downconverted encoded signal and the selected one of the shifted PN sequence of chips and the delayed, shifted PN sequence of chips to decode the downconverted encoded signal.

* * * * *